(No Model.) 4 Sheets—Sheet 1.
J. B. HADAWAY.
STITCH SEPARATING AND INDENTING MACHINE.

No. 549,291. Patented Nov. 5, 1895.

Witnesses:
Walter E. Lombard.
H. Theodore Fletcher.

Inventor:
John B. Hadaway,
by N. C. Lombard
Attorney.

(No Model.)　　　　　　　　　　　　　　　4 Sheets—Sheet 2.
J. B. HADAWAY.
STITCH SEPARATING AND INDENTING MACHINE.
No. 549,291.　　　　　　　　　　Patented Nov. 5, 1895.

Witnesses:　　　　　　　　　　　　　Inventor:
Walter E. Lombard.　　　　　　　　John B. Hadaway,
H. Theodore Fletcher.　　　　　　by N. C. Lombard
　　　　　　　　　　　　　　　　　　Attorney, (No Model.)  
4 Sheets—Sheet 3.

J. B. HADAWAY.
STITCH SEPARATING AND INDENTING MACHINE.

No. 549,291. Patented Nov. 5, 1895.

Witnesses:  
Walter E. Lombard.  
H. Theodore Fletcher.

Inventor:  
John B. Hadaway,  
by N. C. Lombard  
Attorney.

(No Model.)　　　　　　　　　　　　　　　　4 Sheets—Sheet 4.
J. B. HADAWAY.
STITCH SEPARATING AND INDENTING MACHINE.
No. 549,291.　　　　　　　　　Patented Nov. 5, 1895.
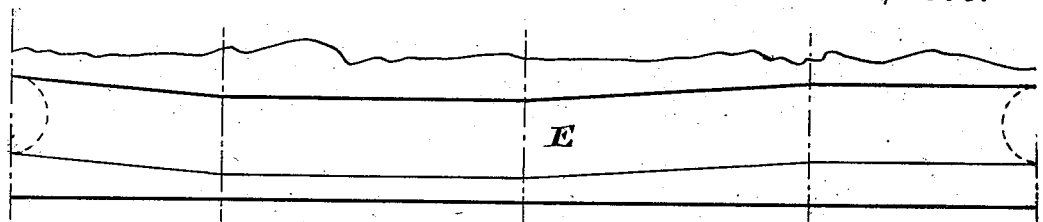
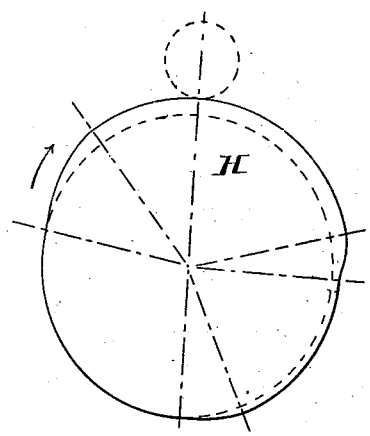 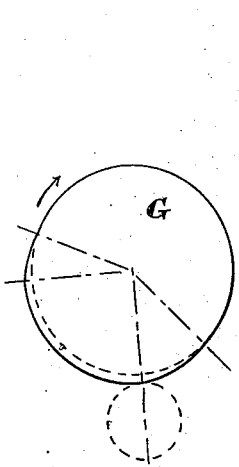 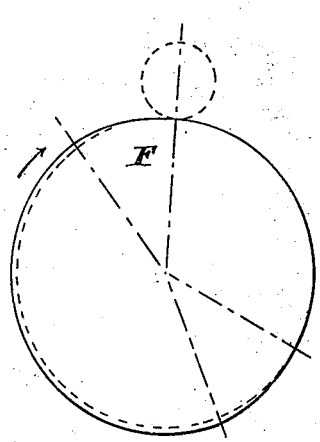
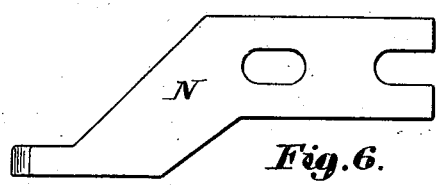  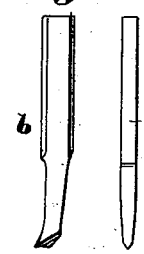 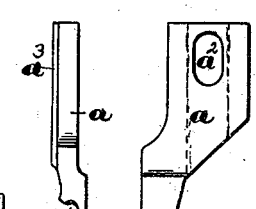
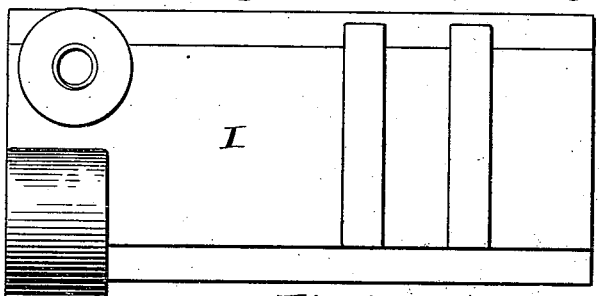 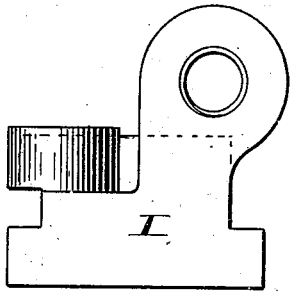
Witnesses:　　　　　　　　　　　Inventor:
Walter E Lombard.　　　　　　　John B. Hadaway,
H. Theodore Fletcher,　　　　　by N. C. Lombard
　　　　　　　　　　　　　　　　　Attorney, ns
UNITED STATES PATENT OFFICE.

REISSUED

JOHN B. HADAWAY, OF BROCKTON, MASSACHUSETTS.

STITCH-SEPARATING AND INDENTING MACHINE.

SPECIFICATION forming part of Letters Patent No. 549,291, dated November 5, 1895.

Application filed August 22, 1895. Serial No. 560,136. (No model.)

*To all whom it may concern:*

Be it known that I, JOHN B. HADAWAY, of Brockton, in the county of Plymouth and State of Massachusetts, have invented certain new and useful Improvements in Stitch-Separating and Indenting Machines, of which the following, taken in connection with the accompanying drawings, is a specification.

My invention relates to stitch-separating and indenting machines; and it consists in certain novel features of construction, arrangement, and combination of parts which will be readily understood by reference to the description of the accompanying drawings, and to the claims hereto appended, and in which my invention is clearly pointed out.

Figure 1:
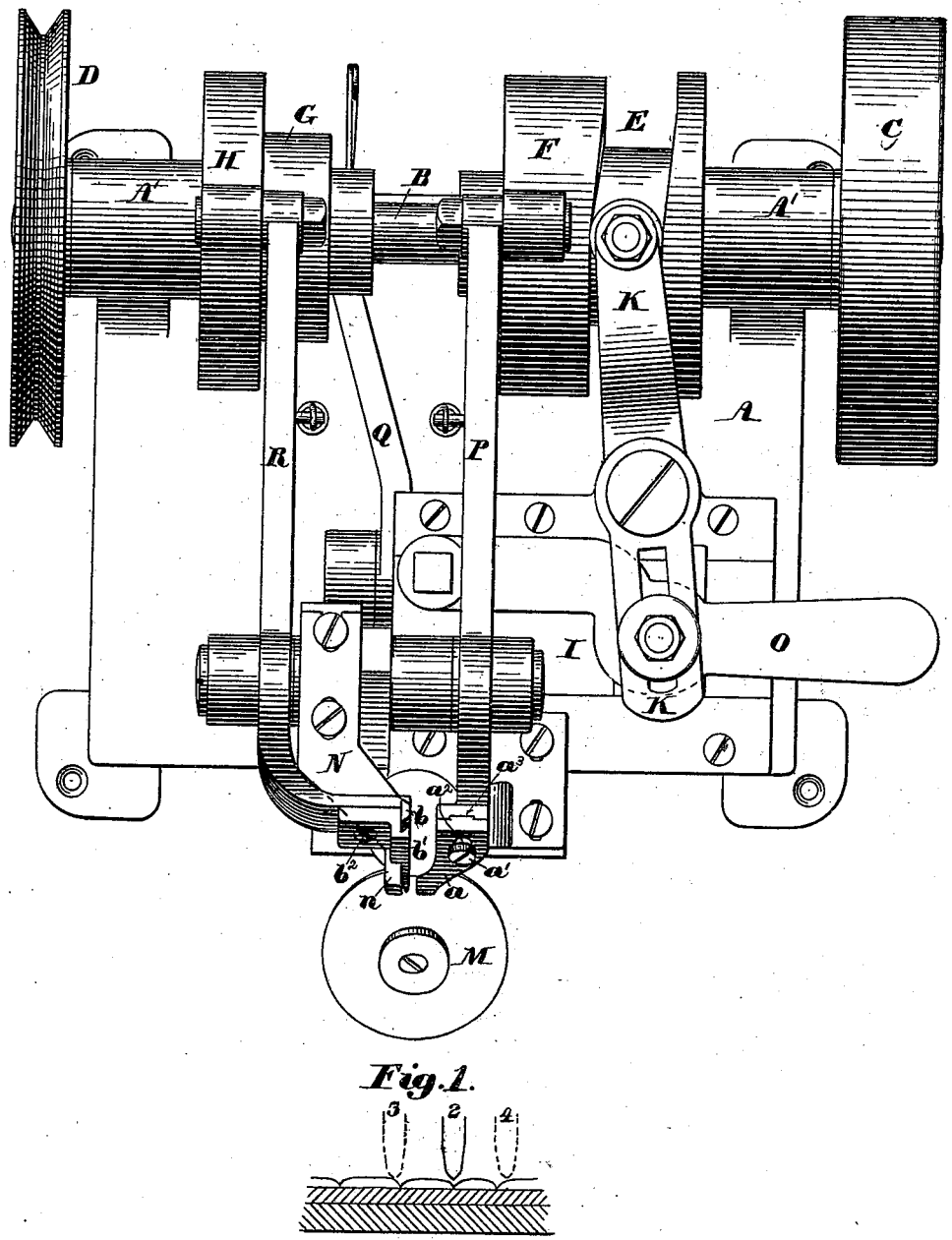
Figure 17:
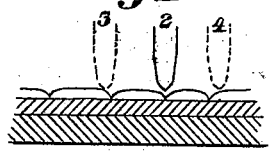
Figure 2:
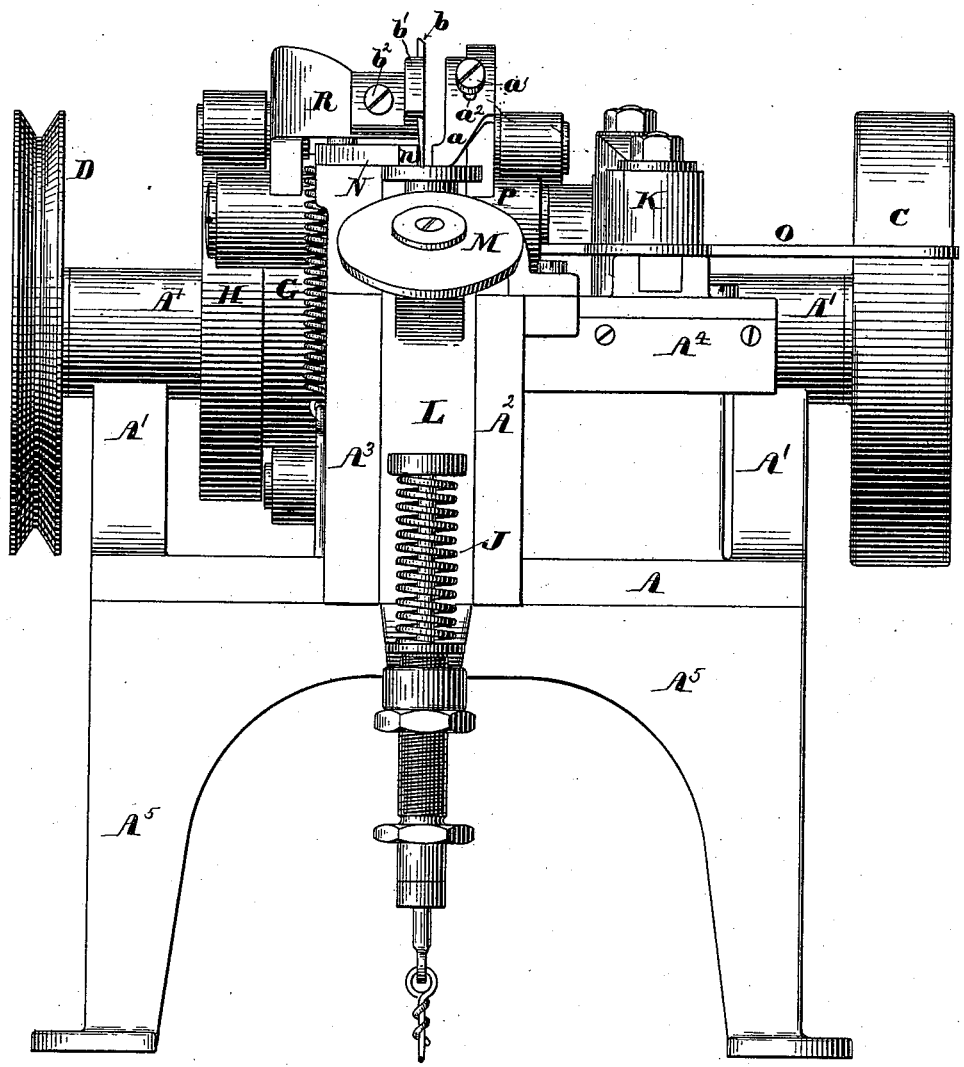
Figure 3:
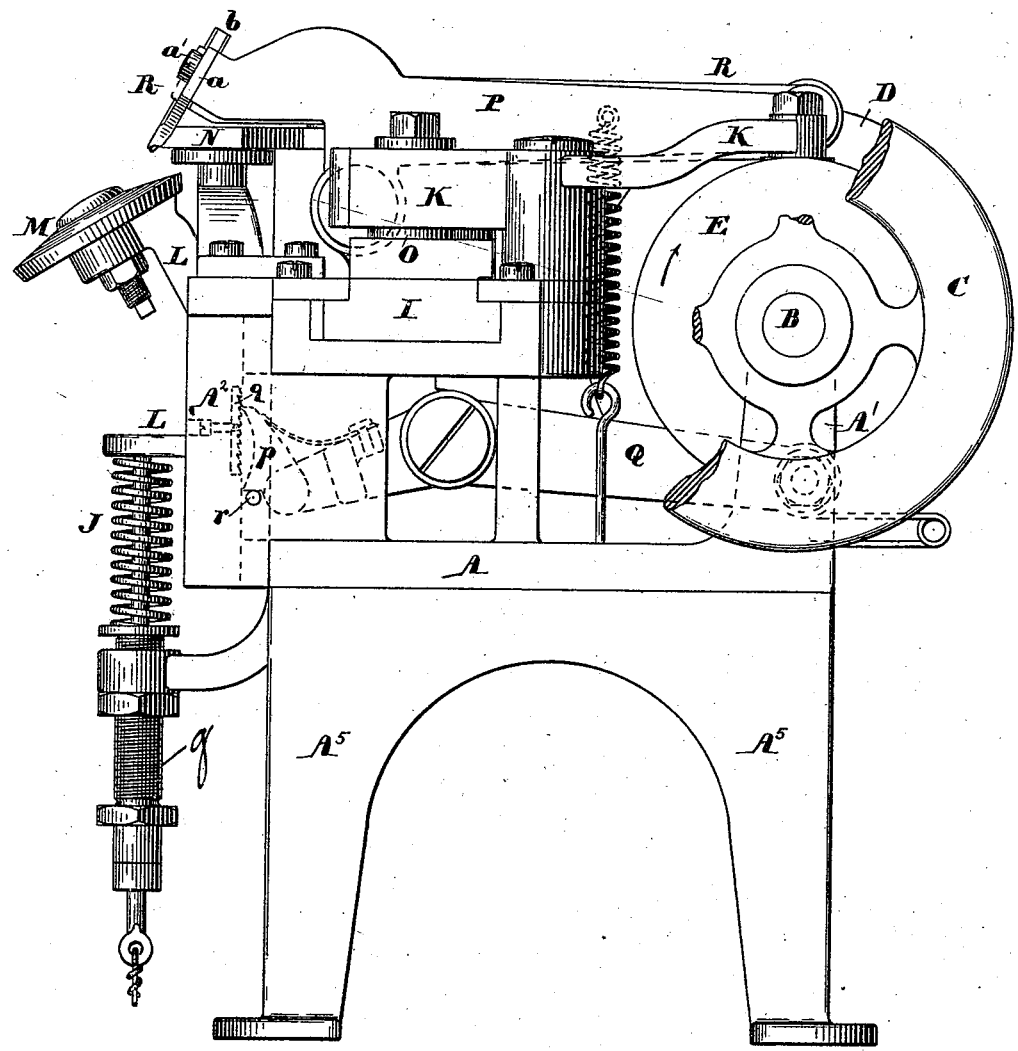

Figure 1 of the drawings is a plan of a machine illustrating my invention. Fig. 2 is a front elevation of the same. Fig. 3 is a side elevation of the same. Figs. 4 and 5 are respectively a plan and an end elevation of the feed-slide. Figs. 6 and 7 are respectively a plan and an edge view of the upper work-support. Figs. 8, 9, and 10 are respectively a front elevation, a side elevation, and an inverted plan of the presser-foot. Fig. 11 is an elevation of the presser-foot-operating cam looking toward the left of Fig. 1. Fig. 12 is an elevation of the cam for operating the separating and indenting tool. Fig. 13 is an elevation of the locking-cam. Fig. 14 is a development of the path of the feed-cam upon a flat plane. Figs. 15 and 16 are respectively a side elevation and an edge view of the separating-tool, and Fig. 17 is a diagram illustrating how the secondary feed is obtained to separate stitches of varying lengths.

The object of my present invention is the production of a machine that is simple in construction, effective in operation, and by the use of which the stitches may be accurately separated and the welts indented in work containing stitches of uniform or slightly-varying lengths. To this end the feeding and separating mechanisms are positive in their working movements and operate, in conjunction with a yielding work-support, a fixed upper work support or stop to limit the upward movement of the work.

The principal features of novelty in my present invention as compared with the inventions described in the Letters Patent Nos. 521,978, 536,338, 537,823, and 543,012, granted to me June 26, 1894, March 26, 1895, April 23, 1895, and July 23, 1895, respectively, and in the applications filed by me June 1 and 28, 1895, respectively, and serially numbered, respectively, 551,342 and 554,372, are, first, the employment of a presser-foot acting in conjunction with a lower yielding work-support to feed the work a definite and predetermined distance corresponding to the standard or average length of stitch for the sample of work in hand, and in conjunction with a fixed finger to form an upper work-support or a stop to limit the upward movement of the work, and, second, a two-throw positive downward movement of the separating and indenting tool with a standstill or rest between them, in conjunction with cams for operating the presser-foot, the locking mechanism, and the separating and indenting tool so constructed and timed relative to each other that the under surface of the presser-foot when in its normal position shall be on a level with the under surface of the fixed stop-finger, shall be depressed below said normal position while feeding the work and until the separating and indenting tool has been moved the first step in its downward movement and be raised to its normal position between the two downward movements of said separating and indenting tool, and that the locking-pawl shall be thrown into contact with the ratchet-locking plate before the last downward movement of the separating and indenting tool in such a manner as to permit the last downward movement of said tool to depress said work-support sufficiently to relieve the work from contact with the fixed stop-finger and then prevent further downward movement, while said tool completes the indenting of the welt and by the action of its inclined side upon the shoulder of a stitch moves the work upon the work-support to the right or left, according as the stitch is longer or shorter than the standard or average stitch.

In the drawings, A represents the bed of the machine-head provided with the bearings A' A', the upwardly-projecting blocks A² and A³, and supported upon the legs A⁵; B, the cam-shaft; C, the hand-wheel; D, the driving-pulley; E, the feed-cam; F, the presserfoot-operating cam; G, the locking-cam. H is the separator-cam. I is the feed-slide, and K is the cam-lever for operating said slide, all constructed and arranged substantially as in another application of mine filed June 1, 1895, Serial No. 551,342, except that the cams have their throws constructed and arranged relative to each other, so as to cause the several movements of the working parts of the machine to be timed to produce the results hereinafter described.

L is the vertically-movable slide, and M is the lower and yielding work-support mounted thereon and pressed upward by the spring J and adjustable by the threaded sleeve $g$, substantially as in the Letters Patent No. 543,012, granted to me July 23, 1895.

O is a hand-lever for adjusting the pin connecting the feed-slide with its operating-lever, constructed and operating substantially as in my before-cited application.

P is the presser-foot lever, Q the locking-lever, and R is the separator-lever, all arranged substantially as in said prior application and operated, respectively, by the cams F, G, and H. The front end of the lever P has firmly secured thereto the presser-foot $a$, but so as to be adjustable vertically thereon by the screw $a'$ passing through the slot $a^2$ and screwing into the lever P, said lever having a vertical groove formed in its front end to receive the rib $a^3$ on the rear of said presser-foot to prevent said foot from being moved about the clamping-screw $a'$, all as shown in Fig. 1.

The front end of the lever R has rigidly secured thereto by the plate $b'$ and the clamping-screw $b^2$ the separating and indenting tool $b$, the lower end of which is made wedge-shaped with its point slightly rounded, as shown in Fig. 16.

The pawls $p$, pivoted to the front end of the lever Q, and the pin $r$, set in the block $A^2$, are so arranged relative to each other that when said pawls are thrown into contact with the ratchet-plate $s$ and are raised to their highest positions the upper end of one of said pawls will be slightly below the shoulder of the tooth of said ratchet next above the end of said pawl, so that the lower work-support M may be slightly depressed by the downward movement of the indenting-tool to relieve the upper surface of the work from contact with the stop-finger or upper work-support N.

The upper work-support N differs from that shown in my before-cited application and patent in that it has but a single narrow finger $n$ to bear upon the work instead of two fingers with a slot between, as in said prior inventions, one of said fingers being cut away and the presser-foot substituted therefor.

The operation of my invention is as follows: The several parts of the machine being in the positions shown in the drawings—viz., the presser-foot in its normal position, with its under surface in the same plane as the under surface of the stop-finger and co-operating therewith to form the upper work-support, the separating-tool in its lowermost position, a boot or shoe in position upon the lower work-support, with the upper surface of the welt bearing against the upper work-support, and the locking-pawl in contact with the ratchet-plate—if the shaft B be revolved in the direction indicated by the arrow on Fig. 3 the first forty degrees of movement of said shaft will unlock the lower work-support and depress the presser-foot to clamp the sole between it and the lower work-support, which is at the same time slightly depressed to relieve the work from contact with the finger N. The next forty degrees of the revolution raises the separator-tool, leaving the work free to be fed by a movement of the feed-slide I toward the left of Figs. 1 and 2, carrying with it the presser-foot and moving the lower work-support about its axis, which movement takes place during the next one hundred degrees, causing a movement of the work toward the left a distance equal to the length of a standard or average stitch, the pin connecting the feed-slide with its operating-lever having previously been adjusted to give to said slide a movement corresponding to the length of the average stitch of the sample of work in hand. The next twenty-five degrees of the revolution causes a descent of the separating-tool through about one-half of its downward movement, and if the stitch to be separated is of the standard length the point of the separating-tool will be directly above the space between the two stitches, as shown at 6 on Fig. 17; but if the stitch to be separated is longer or shorter than the standard stitch the beveled point of the separating-tool, when it is moved downward through the first half of its downward movement, will come in contact with the rounded or oval shoulder of a stitch at the left or right of the space into which it is to enter, according as the stitch is longer or shorter than the standard stitch, as shown at 3 and 4 on Fig. 17. The next forty degrees of the revolution raises the presser-foot to its normal position, releasing the grip upon the work, if the stitch to be separated is longer or shorter than the standard, because of the contact of the stitch-shoulder with the separating-tool preventing the lower work-support being moved upward as fast as the presser-foot, thus leaving the work free to be moved either to the right or left by the action of the stitch-shoulder upon a beveled side of the point of the separating-tool, as it is pressed upward by the tension of the spring J, to bring the center of the space between the two stitches directly beneath the center of the separating-tool, as shown at 2 on Fig. 17. During the next twenty-five degrees of the revolution a locking-pawl is moved into contact with the ratchet-plate, with its upper end slightly below the shoulder of a ratchet-tooth of the locking-plate $q$, and the next fifteen degrees of the revolution completes the downward movement of the separating and indenting tool to complete the separating of the stitches and the indenting of the welt. The next seventy-five degrees of the revolution moves the presser-foot to the right a distance equal to the length of a standard stitch, thus completing a revolution of the cam-shaft with all the parts of the machine in the positions they occupied at starting.

It will be observed that when the stitches are of standard or uniform lengths the feeding of the work is all effected by the horizontal movement of the presser-foot; but if the stitch is longer or shorter than the standard stitch a secondary feed of the work is effected by a moving contact of the rounded shoulder of a stitch with a beveled side of the point of the separating-tool, which may be caused by an upward movement of the lower work-support, a downward movement of the separating-tool, or a combination of both movements. It will also be observed that the feeding by the presser-foot is not accomplished by engagement with the shoulder of the stitch, but by frictional contact with surface of the welt upon either side of the line of stitching, the lower end of the presser-foot having formed therein a groove $t$ to span the stitch and prevent pressure thereon.

What I claim as new, and desire to secure by Letters Patent of the United States, is—

1. In a stitch separating and indenting machine the combination of a yielding lower work support: a presser-foot provided with a groove in its working face to bridge the line of stitching: means for imparting a positive or unyielding movement to said presser foot to clamp the work: and means for moving said presser-foot horizontally to feed the work uniform distances at regular intervals.

2. In a stitch separating and indenting machine the combination of a yielding work support: a positively operated presser-foot co-operating with the yielding work support to clamp and feed the work: a separating and indenting tool non-adjustable to varying lengths of stitches: means for imparting a positive or unyielding downward movement, in two steps, to said separating tool: and means for releasing the grip of the feeding mechanism between the two downward movements of the separating and indenting tool for the purpose specified.

3. In a stitch separating and indenting machine the combination of a clamp or grip mechanism for feeding the work uniform distances at regular intervals: a separating and indenting tool non-adjustable to varying lengths of stitches: means for imparting a positive or unyielding downward movement, in two steps, to said tool to separate the stitches and indent the welt: means for releasing the grip of the feed mechanism between the two downward movements of said tool: and means for arresting the downward movement of the work and work support before the indenting tool has completed its downward movement.

4. In a stitch separating and indenting machine the combination of a grip mechanism for feeding the work: a separating tool: a yielding work support: means for pressing said support upward: a fixed stop finger to limit the upward movement of the work: means for imparting to said separator a positive or unyielding downward movement in two steps: means for releasing the grip of the feed mechanism: and means for arresting the downward movement of the work when released from contact with the stop finger or upper work support, all so constructed and arranged that a moving contact between the rounded shoulder of a stitch and an inclined side of the point of the separating tool shall cause a secondary feeding of the work toward the left or right according as the stitch to be separated is longer or shorter than the standard or average stitch.

5. In a stitch separating and indenting machine the combination of a yielding lower work support; an upper work support comprising a fixed stop finger and a movable bearing surface: a separating and indenting tool having only upward and downward movements: means for imparting to said tool a positive or unyielding downward movement to separate the stitches and indent the welt: a presser-foot constructed and arranged to grip and feed the work: and mechanism for operating said presser foot constructed and arranged to move it downward to clamp the work, then move it horizontally to feed the work uniform distances at regular intervals and then release the grip upon the work when the separating tool has descended through about one half its downward stroke, to leave the work free to automatically adjust itself to bring the space between two stitches directly beneath the point of the separating tool.

6. In a stitch separating and indenting machine the combination of a yelding lower work support: a fixed stop finger: a positively operated presser-foot arranged with its under surface normally on a level with the under surface of said stop finger and co-operating therewith to serve as an upper work support: means for imparting to said presser-foot a positive or unyielding downward movement to clamp the work: means for moving said presser foot horizontally to feed the work a uniform distance corresponding to the length of the standard or average stitch: means for arresting the downward movement of the work support when the work is released from contact with the fixed stop finger: a separating and indenting tool: and means for imparting to said tool a positive or unyielding downward movement to separate the stitches and indent the welt.

7. In a stitch separating and indenting machine, the combination of a yielding lower work support: a presser-foot constructed and arranged to bear upon the welt to grip the work between it and the work support, without bearing upon the stitches: means for imparting a positive or unyielding downward movement to said presser foot to clamp the work: and means for moving said presser foot horizontally to feed the work uniform distances at regular intervals.

8. In a stitch separating and indenting machine, the combination of a yielding lower work support: a presser-foot constructed and arranged to bear upon the welt to clamp the work between it and said work support without pressing upon the stitches: means for imparting to said presser foot a positive or unyielding downward movement to clamp the work: means for moving said presser foot horizontally, to feed the work uniform distances at regular intervals; a separating and indenting tool, non-adjustable to varying lengths of stitches: and means for imparting a positive or unyielding downward movement to said tool, to separate the stitches and indent the work.

In testimony whereof I have signed my name to this specification, in the presence of two subscribing witnesses, on this 19th day of August, A. D. 1895.

JOHN B. HADAWAY.

Witnesses:
N. C. LOMBARD,
WALTER E. LOMBARD.